United States Patent [19]
Takata et al.

[11] Patent Number: 5,133,228
[45] Date of Patent: Jul. 28, 1992

[54] CONTROL SYSTEM FOR SUPERCHARGING ENGINE EQUIPPED WITH AUTOMATIC TRANSMISSION

[75] Inventors: Minoru Takata, Hiroshima; Hiroaki Yokota, Fuji; Hiroyuki Morioka, Hiroshima; Ikuo Onimura, Higashihiroshima, all of Japan

[73] Assignee: Mazda Motor Corporation, Hiroshima, Japan

[21] Appl. No.: 671,410

[22] Filed: Mar. 20, 1991

[30] Foreign Application Priority Data

Mar. 20, 1990 [JP] Japan .................................. 2-68222

[51] Int. Cl.$^5$ .............................................. F16H 61/02
[52] U.S. Cl. ........................................ 74/860; 60/600; 60/602
[58] Field of Search ................ 74/857, 858, 860; 60/600, 601, 602, 603; 123/559.1, 559.3, 560, 561, 562, 564

[56] References Cited

U.S. PATENT DOCUMENTS

| | | | |
|---|---|---|---|
| 4,781,027 | 11/1988 | Richter et al. | 60/602 |
| 4,793,140 | 12/1988 | Esch | 60/600 |
| 4,926,636 | 5/1990 | Tadokoro et al. | 60/602 X |
| 4,926,640 | 5/1990 | Kazuo et al. | 60/602 |
| 4,964,318 | 10/1990 | Ganoung | 74/860 X |
| 5,050,452 | 9/1991 | Morioka | 60/602 X |

FOREIGN PATENT DOCUMENTS

| | | |
|---|---|---|
| 56-41417 | 4/1981 | Japan . |
| 59-160022 | 9/1984 | Japan . |
| 2-108820 | 4/1990 | Japan . |

*Primary Examiner*—Dirk Wright
*Attorney, Agent, or Firm*—Fleit, Jacobson, Cohn, Price, Holman & Stern

[57] ABSTRACT

A control system for supercharging an internal combustion engine equipped with an automatic transmission includes a capacity changeable supercharger. The supercharger is controlled by a supercharging capacity controller, having data representative of at least one supercharging capacity control line, so that its supercharging capacity is charged according to operating conditions of the internal combustion engine. A transmission shift controller, causing the automatic transmission to shift according to operating conditions of the internal combustion engine, has data representative of at least one gear shift control line for a shift operation of the automatic transmission. The at least one gear shift control line has an intermediate portion, including an intersection with the supercharging capacity control line defined by a specific engine load between upper and lower middle vehicle speeds. The shift controller causes a shift of the automatic transmission prior to changing the supercharging capacity at engine operating conditions near an engine operating condition at the intersection.

10 Claims, 4 Drawing Sheets

CONTROL SYSTEM FOR SUPERCHARGING ENGINE EQUIPPED WITH AUTOMATIC TRANSMISSION

BACKGROUND OF THE INVENTION

1. Field of the Invention

This invention pertains to a control device for engines by which several superchargers are controlled, and more particularly, to a control device by which at least a primary supercharger, which supercharges in a low intake region, a secondary supercharger, which supercharges in a high intake region, and an automatic transmission are controlled.

2. Description of Related Art

Conventionally, some kinds of internal combustion engines for vehicles have at least a primary supercharger, which supercharges in what is known as a low intake region, and a secondary supercharger, which supercharges in what is known as a high intake region. These superchargers are selectively activated and controlled in accordance with previously provided or designed switching patterns for various intake conditions of the engine. Moreover, automatic transmissions are used in combination with engines having such first and second superchargers. Such an engine equipped with first and second, or primary and secondary, superchargers and an automatic transmission is known from, for example, Japanese Patent Application No. 63-258,368, laid open as japanese Unexamined Patent Publication No. 2-108,820 on Apr. 20, 1990.

However, the engine described in the above publication, which is equipped with primary and secondary superchargers and an automatic transmission, produces torque shock upon switching of the superchargers. Such torque shock can be suppressed, via a control device, by precisely controlling the switching of the primary and secondary superchargers, but can not be avoided completely.

Automatic transmissions are typically controlled to shift in accordance with previously provided, particularly designed gear shift patterns. Such gear shift patterns generally vary, depending on vehicle running conditions or vehicle speeds and engine operating conditions or engine speeds. In order for the automatic transmission to be reliable in terms of both gear shift shock and attenuation, gear shift timing must be precisely managed. However, since the control of gear shift timing is performed based on the assumption that engine torque during a gear shift will have reached a value that is estimated based on engine properties, if shifting of the automatic transmission is accompanied by switching of the superchargers, the automatic transmission produces torque shock, due to the torque shock generated on switching of the superchargers. For example, because there are cases in which, during acceleration, switching of the superchargers and shifting of the automatic transmission must be simultaneously controlled, there is a chance that torque shock accompanying switching of the superchargers and torque shock accompanying shifting of the automatic transmission will occur simultaneously.

SUMMARY OF THE INVENTION

The primary object of the present invention is to provide a control system for an internal combustion engine having supercharging means of changeable capacity and equipped with an automatic transmission by which the simultaneous occurrence of switching of the supercharging capacity of the supercharging means and shifting of the automatic transmission is avoided.

It is another object of the present invention to provide a control system for an engine, having supercharging means of changeable capacity and equipped with an automatic transmission, by which the chance of compounded torque shock, accompanying a change of the supercharging capacity of the supercharging means together with a shift of the automatic transmission, is reduced.

The objects of the present invention are accomplished by providing a particular control system for an internal combustion engine equipped with an automatic transmission and having supercharging means capable of changing, stepwise, its supercharging capacity. The supercharging means is controlled by supercharging control means, having data representative of at least one supercharging capacity control line for changing the supercharging capacity according to operating conditions of the internal combustion engine. Transmission shift control means, for causing the automatic transmission to shift according to operating conditions of the internal combustion engine, has data representative of at least one gear shift control line for a shift operation of the automatic transmission. The gear shift control line is provided with an intermediate portion, which includes an intersection with the supercharging capacity control line, defined by a specific engine load between upper and lower middle vehicle speeds. The automatic transmission is thereby shifted prior to changing the supercharging capacity of the supercharging means at engine operating conditions near an engine operating condition at the control line intersection.

In place of providing the gear shift control line with such an intermediate portion, shift enforcing means may be provided in order to force the automatic transmission to shift independently from a gear shift control line at operating conditions near the supercharging capacity control line until the transmission shift control means has caused the automatic transmission to shift according to the gear shift control line. The automatic transmission is thereby shifted prior to changing the supercharging capacity of the supercharging means at engine operating conditions near an engine operating condition at the control line intersection.

In the control system, the supercharging control means has data representative of as many supercharging capacity control lines as gear shift control lines. The supercharging means may comprise two superchargers, such as two independently operative turbochargers, one of which is activated throughout the whole range of engine operating conditions and the other of which is activated in a range of engine operating conditions on a side of higher engine speeds with respect to the supercharging capacity control line.

Because the gear shift control line has either an intermediate portion in which a throttle opening is invariable or a buffer zone, both of which include an intersection between the gear shift control line and supercharging capacity control line, shifting of the automatic transmission is performed prior to changing the capacity of the supercharging means. Thus, simultaneous changing of the supercharging capacity and shifting of the automatic transmission is avoided, and the amount of torque shock is reduced.

BRIEF DESCRIPTION OF THE DRAWINGS

The above and other objects and features of the present invention will be apparent from the following description of a preferred embodiment thereof when considered in conjunction with the appended drawings, in which.

DESCRIPTION OF THE PREFERRED EMBODIMENT

Figure 1:
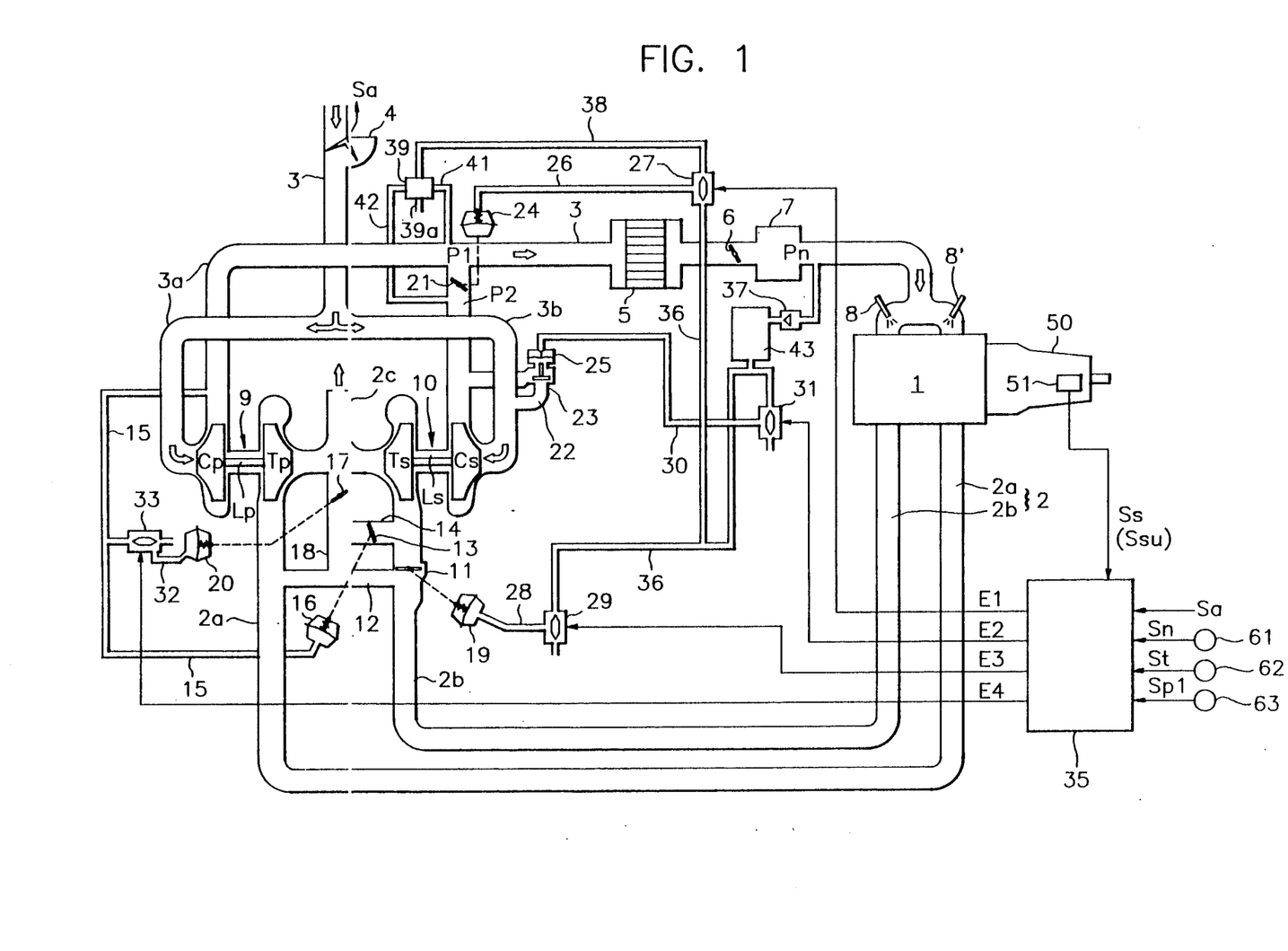
FIG. 1 is a schematic diagrammatical view of an engine control system for an engine equipped with superchargers and an automatic transmission according to a preferred embodiment of the present invention.

Referring now to the drawings in detail, and in particular to FIG. 1, an internal combustion engine 1, such as a rotary engine or a reciprocating engine, equipped with an automatic transmission which is controlled with an engine control system in accordance with a preferred embodiment of the present invention, is shown. The internal combustion engine 1 is equipped with two superchargers, namely, a primary supercharger 9, which is used at least in a low intake air rate range or region, and a secondary supercharger 10, which is used in a high intake air rate range or region. Both of these superchargers are installed in an intake-exhaust system. Each of the superchargers 9 and 10 is a turbocharger which is driven by exhaust gases from the engine and can be of any known turbocharger type. The engine 1 is also equipped with an automatic transmission 50, connected to an output axle of the engine 1, which is automatically placed in any desired one of a plurality of speed ranges and speed gears.

Engine 1 is provided with exhaust passage 2, which comprises first and second exhaust pipes 2a and 2b, for discharging exhaust gases from the engine 1. The engine 1 is further provided with an intake passage, such as an intake pipe 3, for introducing intake air into the engine 1. The intake pipe 3 is provided with, from the upstream side thereof, an air flow meter 4, the primary and 10, an inter-cooler 5, a throttle valve 6, a surge tank 7 and fuel injectors 8 disposed in discrete pipes. Each of the individual elements mentioned above is itself well known in the art.

The intake pipe 3 is further provided with first and second branch intake pipes 3a and 3b that separately branch off from the intake pipe 3 downstream of the air flow meter 4 and merge into the intake pipe 3 upstream of the intercooler 5. The primary and secondary turbochargers 9 and 10 are disposed in the first and second branch intake pipes 3a and 3b, respectively.

Primary turbocharger 9 comprises a rotary turbine Tp, disposed in the first exhaust pipe 2a, and is driven by exhaust gases from the engine 1 and a rotary blower Cp, disposed in the first branch intake pipe 3a and connected to the turbine Tp by a rotary shaft Lp. Similarly, the secondary turbocharger 10 comprises a rotary turbine Ts, disposed in the second exhaust pipe 2b, and is driven by exhaust gases from the engine 1 and a rotary blower Cs disposed in the second branch intake pipe 3b and connected to the turbine Ts by a rotary shaft Ls.

To allow pressure waves produced in one of the first and second branch intake pipes 3a and 3b to be transmitted so that they propagate easily to the other of the first and second branch intake pipes 3a and 3b, and yet not be fluxed, or propagated, into the intake pipe 3 upstream of the first and second branch intake pipes 3a and 3b, the first and second branch intake pipes 3a and 3b, upstream of the blowers Cp and Cs, respectively, are partly aligned in a straight line.

The second exhaust pipe 2b is provided with a shut-off valve 11, disposed upstream of the turbine Ts of the secondary turbocharger 10. Shut-off valve 11 is operated by a diaphragm actuator 19 to shut off the second exhaust pipe 2b and prevent exhaust gases from the engine 1 from being forced to flow toward the turbine Ts of the secondary turbocharger 10, thereby allowing only the primary turbocharger 9 to work while a relatively small amount of intake air is delivered into the engine 1.

First and second exhaust pipes 2a and 2b, upstream of the respective turbines Tp and Ts, are interconnected to each other by way of a communication pipe 12. The communication pipe 12 is connected, at its mid portion, by way of a bypass pipe 18, provided with an waste gate valve 17, to a common exhaust pipe 2c opening to the atmosphere. The second exhaust pipe 2b, downstream of the communication pipe 12, and the bypass pipe 18, upstream of the waste gate valve 17, are connected to each other by way of a communication pipe 14 provided with an exhaust gas relief valve 13. These valves 13 and 17 are, respectively, driven by diaphragm actuators 16 and 20, having pressure chambers which are in communication with the first branch intake pipe 3a downstream of the primary turbocharger 9 by way of a control pressure pipe 15.

The second branch intake pipe 3b is provided with an intake air shut-off valve 21 disposed therein downstream of the secondary turbocharger 10. The second branch intake pipe 3b is further provided with an intake air relief pipe 22 including a relief valve 23 so that intake air bypasses the secondary turbocharger 10 from an upstream part of the second branch intake pipe 3b to a downstream part thereof. The intake air shut-off valve 21 and the intake air relief valve 23 are driven independently of each other by diaphragm actuators 24 and 25 to shut off an intake air flow in the second branch intake pipe 3b and the intake air relief pipe 22, respectively.

The diaphragm actuators 19, 20, 24 and 25, for the valves 11, 17, 21 and 23, respectively, are, respectively, connected by way of control pressure pipes 28, 32, 26 and 30 to three-way solenoid valves 29, 33, 27 and 31. The three-way solenoid valve 27 has an inlet port connected to a pressure difference detecting valve 39 through a pipe 38 and an inlet port connected to a negative pressure chamber 43 through a pipe 36. The three-way solenoid valve 29 has an inlet port opening to atmosphere and an inlet port connected to the negative pressure chamber 43 through the pipe 36. The three-way solenoid valve 31 has an inlet port opening to atmosphere and an inlet port connected to the negative pressure chamber 43. The three-way solenoid valve 33 has an inlet port opening to atmosphere and an inlet port connected to the communication pipe 15. The pressure difference detecting valve 39 has an outlet port 39a opening to atmosphere and inlet ports connected to the branch intake pipes 3a and 3b by way of pipes 41 and 42, respectively, so as to detect a difference between respective pressures P1 and P2 in the branch intake pipe 3a and 3b. The negative pressure chamber 43 is supplied, through a check valve 37, with negative pressure Pn created in the intake pipe 3 downstream of the intercooler 5. These three-way solenoid valves 27, 29, 31 and 33, respectively, are controlled, by a control unit 35, comprising a general purpose microcomputer, to operate, pneumatically, the diaphragm actuators 24, 19, 25 and 20, respectively.

Control unit 35 receives various signals Sa, Sn, Ss, St and Sp1, representative of the amount of intake air flowing through the intake pipe 3, the speed of shaft rotation of the engine 1, or engine speed, the desired gear shift position of the automatic transmission 50, the opening, or operated position, of the throttle valve 6, and air pressure P1 in the intake pipe 3 downstream of the primary turbocharger 9 These signals are, respectively, provided by the air flow meter 4, an engine speed sensor 61, a gear position sensor 51, a throttle sensor 62 and a pressure sensor 63. The control unit 35 provides, in response to engine operating conditions represented by these input signals Sa, Sn, Ss, St and Sp1, the three-way solenoid valves 27, 31, 29 and 33 with control signals E1, E2, E3 and E4, respectively, according to a programmed sequence, so as to actuate the three-way solenoid valves 27, 29, 31 and 33.

The pressure difference detecting valve 39 opens its pressure chamber to atmosphere through the outlet port 39a when the pressure difference, between air pressures P1 and P2 in the branch intake pipes 3a and 3b, is relatively large, and closes the output port 39a when the difference, between the air pressures P1 and P2 in the branch intake pipes 3a and 3b, is equal to or smaller than a predetermined pressure difference Pd. Accordingly, when the control pressure pipe 26 is communicated with the pipe 38 through the three-way solenoid valve 27 in the presence of the control signal E1, and the pressure difference between the air pressures P1 and P2 is larger than the predetermined pressure difference Pd, the diaphragm actuator 24 is opened to the atmosphere, so as to open the intake air shut-off valve 21. By contrast, when the control pressure pipe 26 is communicated with the pipe 36 through the three-way solenoid valve 27 in the presence of the control signal E1, negative pressure develops in the diaphragm actuator 24, so as to close the intake air shut-off valve 21.

Further, when the control pressure pipe 28 is communicated with the pipe 36 through the three-way solenoid valve 29 in the presence of the control signal E3, negative pressure develops in the diaphragm actuator 19, so as to close the exhaust gas shut-off valve 11 and thereby to allow only the primary turbocharger 9 to work. On the other hand, when the control pressure pipe 28 opens to the atmosphere through the three-way solenoid valve 29 in the presence of the control signal E3, the exhaust gas shut-off valve 11 is opened, so as to allow the secondary turbocharger 10 to work.

Figure 2:
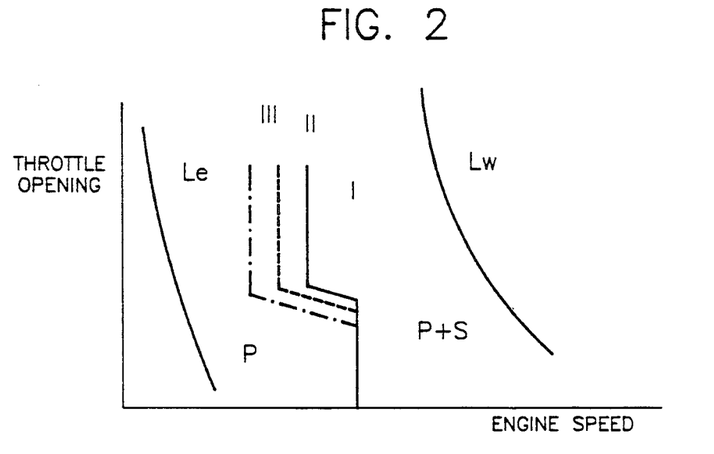
FIG. 2 is a diagram showing supercharger switching control lines.

Referring to FIG. 2, supercharger switching control patterns or lines are shown in terms of the correlation between engine speed and throttle opening. The control unit 35 operates the valves 11, 13, 17 21 and 23 according to these patterns or lines so as to drive, selectively, the primary and secondary superchargers 9 and 10. Data for the control lines shown in FIG. 2 are stored as a control map in the microcomputer of the control unit 5 in a well known manner. Supercharging is performed by the primary supercharger 9 over all ranges, including ranges of lower and higher engine speeds, or by both the primary and the secondary superchargers 9 and 10 in the range of higher engine speeds only. The range of higher engine speeds is defined when a plot of throttle opening and engine speed is located on the higher speed side of each switching control line I, II or III. The switching control lines I, II and III are selectively used, according to engine operating conditions, such as engine speed and engine load, so as to create a desired supercharging condition for the engine 1.

The waste gate valve 17 is closed when it is determined, with respect to a control line Lw that the engine is operating in a range of lower engine speeds, and is opened when it is determined, with respect to the control line Lw, that the engine is operating a range of higher engine speeds. The exhaust gas relief valve 13 is closed when it is determined, with respect to a control line Le, that the engine is operating in a range of lower engine speeds, and is opened when it is determined, with respect to the control line Le, that the engine is operating in a range of higher engine speeds. The intake air relief valve 23 is opened when it is determined, with respect to the control line III, that the engine is operating in a range of lower engine speeds, and is closed when it is determined, with respect to the control line III, that the engine is operating in a range of higher engine speeds. The exhaust gas shut-off valve 11 is closed when it is determined, with respect to the control line II, that the engine is operating in a range of lower engine speeds, and is opened when it is determined, with respect to the control line II, that the engine is operating in a range of lower engine speeds. Finally, the intake air shut-off valve 21 is opened when it is determined, with respect to the control line I, that the engine is operating in a range of lower engine speeds, and is closed when it is determined, with respect to the control line I, that the engine is operating in a range of higher engine speeds.

In a case in which the engine 1 operates at relatively low speeds, the negative pressure Pn is delivered, through the three-way solenoid valve 31 and the control pressure pipe 30, to the intake air relief valve 23, so that the intake air relief valve 23 keeps the intake air relief passage 22 open. Thereafter, when receiving the control signal E2 from the control unit 35, the three-way solenoid valve 31 is actuated to open the control pressure pipe 30 to the atmosphere, so as to cause the intake air relief valve 23 to shut off the intake air relief passage 22 before the exhaust gas shut-off valve 11 and the intake air shut-off valve 21 are opened, while the engine increasingly changes its speed.

When the engine 1 operates so that a plot of throttle opening and engine speed is in the area of operating conditions having the control line III as an upper boundary, the control unit 35 keeps both the exhaust gas shut-off valve 11 and the intake air shut-off valve 21 closed and the intake air relief valve 23 open, so that only the primary turbocharger 9 is caused to work for supercharging the engine 1. Then, when the engine 1 changes its operating condition to increase intake air and/or the engine speed beyond the boundary of control line III, into the area of operating conditions between the control lines III and II, the control unit 35 closes the intake air relief valve 23. During this period, before the intake air relief valve 23 closes, the exhaust gas relief valve 13 is opened, when the intake air rate increases, in an amount sufficient to cross the line Le, so as to thereby deliver a slight amount of exhaust gas into the turbine Ts of the secondary turbocharger 10 as long as the intake air relief valve 23 is open. This results in the turbine Ts being driven by the exhaust gas flowing through the exhaust gas relief passage 14 so that the secondary turbocharger 10 is subjected to preliminary rotation before the exhaust gas shut-off valve 11 opens.

Thereafter, when a further increase in intake air rate and/or engine speed is caused, so that a plot of throttle opening and engine speed crosses the control line II into the area of operating conditions between control lines II and I, the control unit 35 opens the exhaust gas shut-off valve 11. Then, when a still further increase in intake air rate and/or engine speed is caused, so that the plot crosses the control line I into the area of operating conditions so that the control line I is a lower limit, the control unit 35 opens the intake air shut-off valve 21, so that both the turbine Tp of the primary turbocharger 9 and the turbine Ts of the secondary turbocharger 10 are driven by the exhaust gas passing through the first and second separated exhaust pipes 2a and 2b, respectively. Thus, both the primary and secondary turbochargers 9 and 10 work to supercharge the engine 1.

Although in this embodiment, three switching control lines I, II and III have been established, the number of switching control lines may be increased or decreased according to engine control demands.

Figure 3:
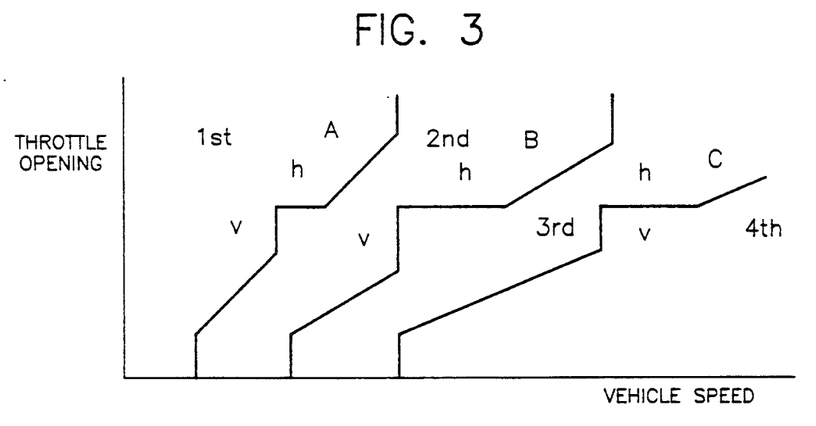
FIG. 3 is a diagram showing transmission gear shifting control lines.

Referring to FIG. 3, transmission gear shifting control patterns or lines are shown in terms of the correlation between vehicle speed and throttle opening. The control unit 35 causes the automatic transmission 50 to shift itself in any desired gear through the use of these patterns or lines. Data for the control lines shown in FIG. 3 are also stored as a control map in the microcomputer of the control unit 35 in a well known manner. The automatic transmission 50 shifts from first gear to second gear when a current running condition of the vehicle is on the shift control line A, from second to third when the current running condition is on the shift control line B, and from third to fourth when the current running condition is on the shift control line C.

Figure 4:
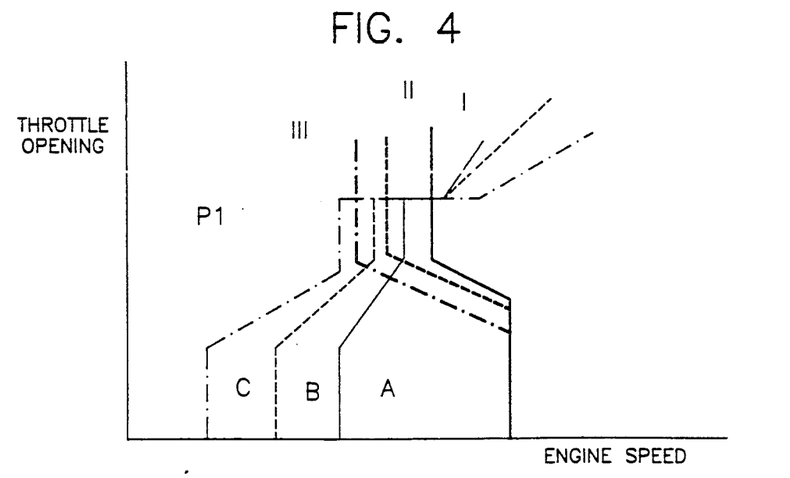
FIG. 4 is a diagram showing overlapping, superimposed supercharger switching and transmission gear shifting control lines.

Each shift control line A, B or C has a buffer zone, defined by a horizontal line segment h and a vertical line segment v. The horizontal line segment h is invariable in throttle opening, regardless of changes in vehicle speed. The vertical line segment v, which immediately preceeds the horizontal line segment h, is invariable in vehicle speed, regardless of changes in throttle opening. The horizontal line segment h of each shift control line is defined in a range of vehicle speeds in which the shift control line is intersected by the corresponding supercharger switching control line, as is shown in FIG. 4, considering, as an example, the switching control line I and shift control lines A, B and C. It is to be noted that in FIG. 4, the switching control line and shift control lines are shown on the same coordinates. This is made possible by adjusting, via control unit 35, vehicle speed to engine speed by the use of gear ratios as parameters.

Figure 5:
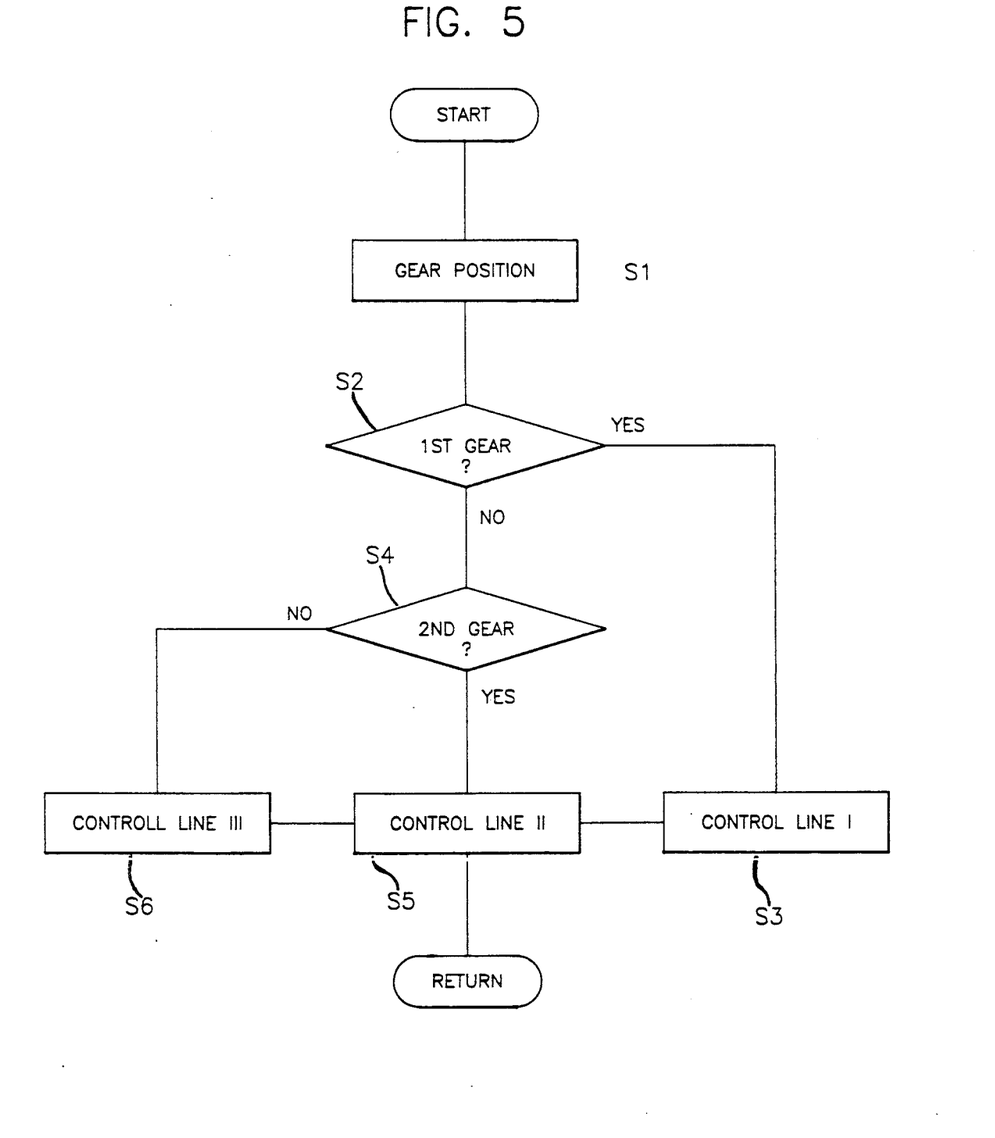
FIG. 5 is a flow chart illustrating the sequential operation of the control device for managing supercharger switching control and transmission gear shifting control.

The selection of the switching control lines I, II and III shown in FIG. 2 is understood by reviewing FIG. 5, which is a flow chart illustrating a supercharger switching control line selection routine for a microcomputer of the controller 35. Programming a computer is a skill well understood in the art. The following description is written to enable a programmer having ordinary skill in the art to prepare an appropriate program for the microcomputer of the controller 35. The particular details of any such program would, of course, depend upon the architecture of the particular computer selected.

Referring to FIG. 5, the first step S1 is to read a signal Ss from the gear position sensor 51 and, thereby, to recognize, based on the gear position signal Ss, the gear position in which the automatic transmission 50 is placed according to an engine demand. Then, decisions are made in order to select one of the switching control lines I through III, based on the recognized gear.

First, a decision is made at step S2 as to whether the recognized gear is first gear. If the recognized gear is first gear, as the result of the decision the control unit 35 selects switching control line I, and retrieves from memory the data representative of the switching control line I at step S3. However, if the recognized gear is not first gear, a second decision is made at step S4, based on the gear position signal Ss, to determine whether the automatic transmission 50 is in second gear. As the result of the decision in step S4, the control unit 35 selects the switching control line II, and either retrieves the data representative of the switching control line II at step S5, if the recognized gear is second gear, or selects the switching control line III and retrieves the data representative of the switching control line III at step S6, if the recognized gear is not second gear.

When an operating condition of the engine 1 changes from a condition P1, shown in FIG. 4, in which the vehicle runs with an engine speed at which the automatic transmission 50 is automatically placed in first gear, to a condition in which the vehicle runs with an engine speed at which the automatic transmission 50 is automatically placed in second gear, the control unit 35 has retrieved the data representative of the shift control line A for causing the automatic transmission 50 to shift itself automatically into second gear, and the data representative of the switching control line I for selectively activating the primary and secondary superchargers 8 and 9, according to the change of engine demand. As the speed of the engine 1 increases and the vehicle speeds up, the control unit 35, monitoring engine speed and throttle opening based on the signals Sn and St, makes a judgement causing the automatic transmission 50 to shift itself automatically into second gear, based on the shift control line A, and causing the primary and secondary superchargers 8 and 9 to be selectively activated. When the engine operating condition changes so as to approach the lower part of shift control line A and eventually cross from right to left of the shift control line A, viewing FIG. 3, the control unit 35 provides the automatic transmission controller 51 with a shift signal Ss so as to cause the automatic transmission 50 to shift itself automatically into second gear. If the engine operating condition further changes beyond the lower part of the shift control line A, and reaches the switching control line I, then, the control unit 35 provides an appropriate combination of signals E1 to E4 so as to actuate both the primary and secondary superchargers 9 and 10. However, when the engine operating condition changes so as to approach the middle part of the shift control line A, including the vertical and horizontal line segments v and h, and further changes across line segment v or h of the shift control line A, the control unit 35 provides the automatic transmission controller 51 with the shift signal Ss so as to cause the automatic transmission 50 to shift itself automatically into second gear. Soon after, and not simultaneously upon, reaching the switching control line I, the control unit 35 provides an appropriate combination of signals E1 to E4 to actuate both the primary and secondary superchargers 9 and 10. Otherwise, if the engine operating condition changes so as to approach the upper part of the shift control line A, without crossing line segment v or h of the shift control line A, for, for example, quick acceleration, and reaches the switching control line I first, the control unit 35 provides the appropriate combination of signals E1 to E4 so as to actuate both the primary and secondary superchargers 9 and 10. If the engine operating condition further changes beyond the switching control line I and reaches the upper part of the shift control line A, the control unit 35 provides, for the first time, the automatic transmission controller 51 with the shift signal Ss, so as to cause the automatic transmission 50 to shift itself automatically into second gear. In any event, when the automatic transmission 50 has shifted into second gear, the control unit 35 retrieves the data representative of the shift control line B for automatically causing the automatic transmission 50 to shift itself into third gear from second gear and the data representative of the switching control line II for selectively activating the primary and secondary supercharger 8 and 9.

When engine operating condition changes from a condition wherein the vehicle runs at an engine speed at which the automatic transmission 50 is placed in second gear or third gear to a condition wherein the vehicle runs at an engine speed at which the automatic transmission 50 is placed in third gear or fourth gear, respectively, the selective switching operation of the primary and secondary superchargers 8 and 9 is performed in the same manner as when changing from the first condition to the second condition.

While the speed of engine increasingly changes, even if the throttle valve 6 maintains its opening at the opening represented by the intersection between the horizontal line segment h of each shift control line and the corresponding switching control line, the automatic transmission 50 never undergoes a gear shift operation before the switching of activation of the primary and secondary superchargers 9 and 10.

Figure 6:
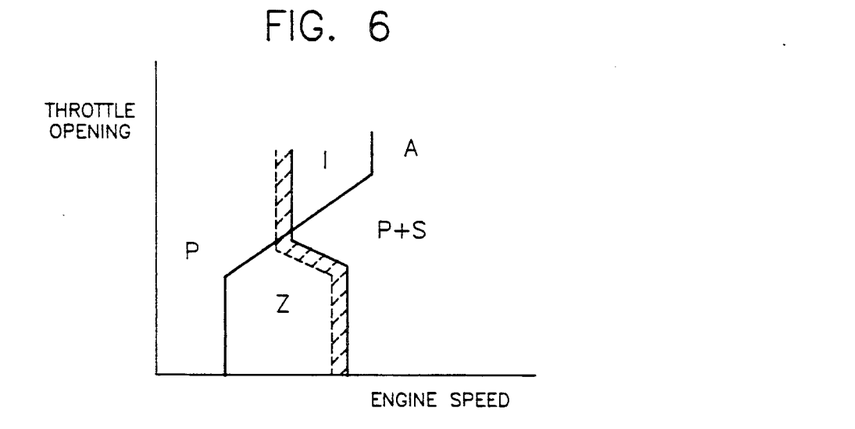
FIG. 6 is a diagram showing the supercharger switching and transmission gear shifting control lines according to another preferred embodiment of the present invention.

In spite of forming each shift control line A, B or C with a horizontal line segment h and vertical line segment v as a buffer zone, a buffer zone Z for forcing the automatic transmission 50 to shift up may be provided adjacent to each switching control line, as is shown in FIG. 6. That is, when an engine operating condition of the engine 1 changes, e.g., from a condition in which the vehicle runs with a particular engine speed and in which the automatic transmission 50 has been placed in, for instance, first gear, and reaches the buffer zone Z, adjacent to the switching control line I the automatic transmission 50 is forced to shift into second gear if it has not been placed in second gear independently from the shift control line A.

Figure 7:
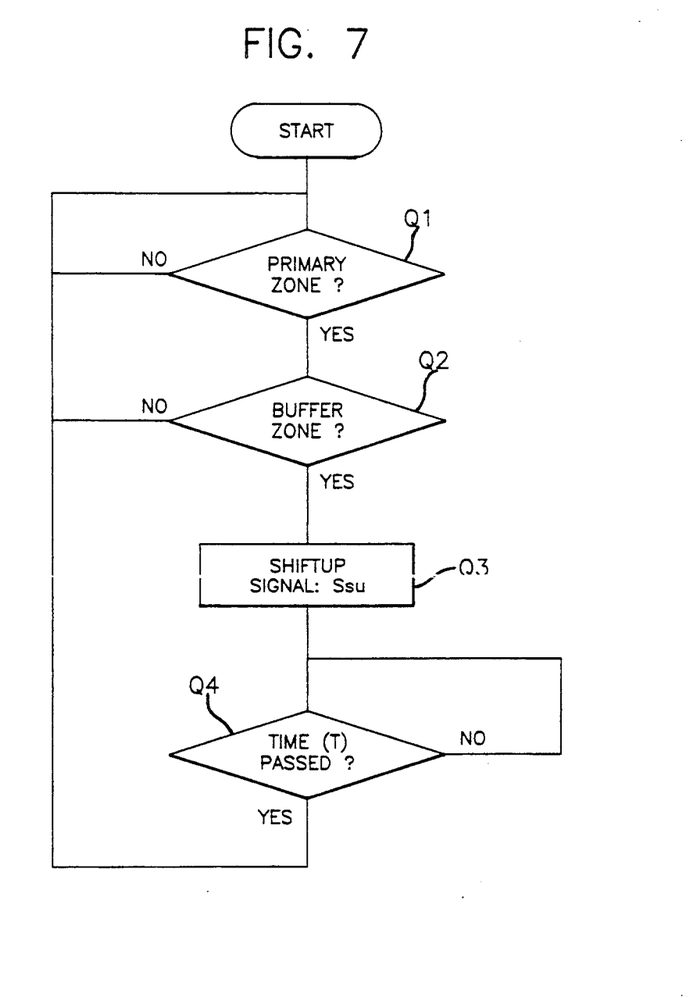
FIG. 7 is a flow chart illustrating the sequential operation of the control device for managing supercharger switching control and transmission gear shifting control by using the supercharger switching and transmission gear shifting control lines shown in FIG. 6.

The forced shiftup control of the automatic transmission 50 will be understood by referring to FIG. 7, which is a flow chart illustrating a forced shift-up routine for the microcomputer of the controller 35. Programming a computer is a skill well understood in the art. The following description is written to enable a programmer having ordinary skill in the art to prepare a appropriate program for the microcomputer of the controller 35. The particular details of any such program would, of course, depend upon the architecture of the particular computer selected.

It is to be noted that the forced shift-up routine is repeated from just after the engine 1 is started until it is stopped. After the engine 1 starts, a switching control line, for instance, the switching control line I, is selected in the supercharger switching control line selection routine illustrated by the flow chart shown in FIG. 5. The first step Q1 in the forced shift-up routine is to make a decision as to whether the engine 1 operates in a zone in which only the primary supercharger 9 should be activated, i.e., a zone defined by the lower engine speed side of switching control line I (which is referred to as a primary zone). If the engine 1 operates in the primary zone, then, a decision is made at step Q2 as to whether the operating condition of the engine 1 is in the buffer zone Z. If the answer to the first decision at step Q1 is no, or the answer to the second decision at step Q2 is no even though the answer to the first decision at step Q1 was yes, the routine returns to the first decision at step Q1. If the answer to the second decision at step Q2 is yes, i.e., the engine 1 currently operates in the buffer zone Z the control unit 35 provides the automatic transmission 50 with a shiftup signal Ssu at step Q3, but only when the automatic transmission 50 is in first gear, so as to force the automatic transmission 50 to shift up into second gear independently of the shift control line A. However, if the automatic transmission 50 has been placed in second gear, depending upon the shift control line A, before the operating condition of the engine changes and reaches the buffer zone no shiftup signal Ssu is provided. Thereafter, a final decision is made at step Q4 as to whether a predetermined period of time T has passed. Because of the fact that the control unit 35 counts the time period T, even when the engine 1 changes its operating condition so as to repeatedly enter and come out of the buffer zone Z in a relatively short period of time after the automatic transmission 50 has shifted into the second gear, the automatic transmission 50 does not repeatedly shift up and down in the time period T.

It is to be understood that although the present invention has been described in detail with respect to a preferred embodiment thereof, various other embodiments and variants are possible which fall within the scope and spirit of the invention, and such embodiments and variants are intended to be covered by the following claims.

What is claimed is:

1. A control system for a supercharging internal combustion engine equipped with an automatic transmission, comprising:

supercharging means capable of changing stepwise a supercharging capacity for supercharging the internal combustion engine;

supercharging control means having data representative of at least one supercharging capacity control line for changing said supercharging capacity of said supercharging means according to operating conditions of the internal combustion engine; and transmission shift control means for causing the automatic transmission to shift according to operating conditions of the internal combustion engine, said transmission shift control means having data representative of at least one gear shift control line for a shift operation of the automatic transmission, said gear shift control line having an intermediate portion, including an intersection with said supercharging capacity control line, which is defined by a specific engine load between upper and lower middle vehicle speeds, said transmission shift control means shifting the automatic transmission prior to changing said supercharging capacity of said supercharging means at engine operating conditions near an engine operating condition at said intersection.

2. A control system as defined in claim 1, wherein said gear shift control line has another intermediate portion, before said intermediate portion, which is defined by a specific vehicle speed between upper and lower middle engine loads.

3. A control system as defined in claim 2, wherein said supercharging control means has data representative of as many of said supercharging capacity control lines as there are gear shift control lines.

4. A control system as defined in claim 3, wherein said supercharging means comprises two superchargers, one of which is activated throughout an entire range of engine operating conditions, the other being activated in a range of engine operating conditions having high engine speeds with respect to said supercharging capacity control line.

5. A control system as defined in claim 4, wherein each of said superchargers comprises a turbocharger.

6. A control system for a supercharging internal combustion engine equipped with an automatic transmission, comprising:

supercharging means capable of changing stepwise a supercharging capacity for supercharging the internal combustion engine;

supercharging control means having data representative of at least one supercharging capacity control line for changing said supercharging capacity of said supercharging means according to operating conditions of the internal combustion engine; and transmission shift control means for causing the automatic transmission to shift according to operating conditions of the internal combustion engine, said transmission shift control means having data representative of at least one gear shift control line for a shift operation of the automatic transmission; and shift enforcing means for forcing the automatic transmission to shift independently of said at least one gear shift control line at operating conditions near said supercharging capacity control line until said transmission shift control means has caused the automatic transmission to shift according to said at least one gear shift control line, thereby shifting the automatic transmission prior to changing said supercharging capacity of said supercharging means at engine operating conditions near an engine operating condition at an intersection of said gear shift control line and said supercharging capacity control line.

7. A control system as defined in claim 6, wherein said shift enforcing means comprises data representative of a zone of engine operating conditions adjacent to, and on a side of lower engine speeds of, said supercharging capacity control line.

8. A control system as defined in claim 7, wherein said supercharging control means has data representative of as many of said supercharging capacity control lines as there are gear shift control lines.

9. A control system as defined in claim 8, wherein said supercharging means comprises two superchargers, one of which is activated throughout an entire range of engine operating conditions, the other being activated in a range of engine operating conditions having high engine speeds with respect to said supercharging capacity control line.

10. A control system as defined in claim 9, wherein each of said superchargers comprises a turbocharger.

* * * * *